Nov. 1, 1966     W. D. MACGEORGE     3,283,233
ELECTRONIC CONTROL SYSTEM
Filed July 15, 1963
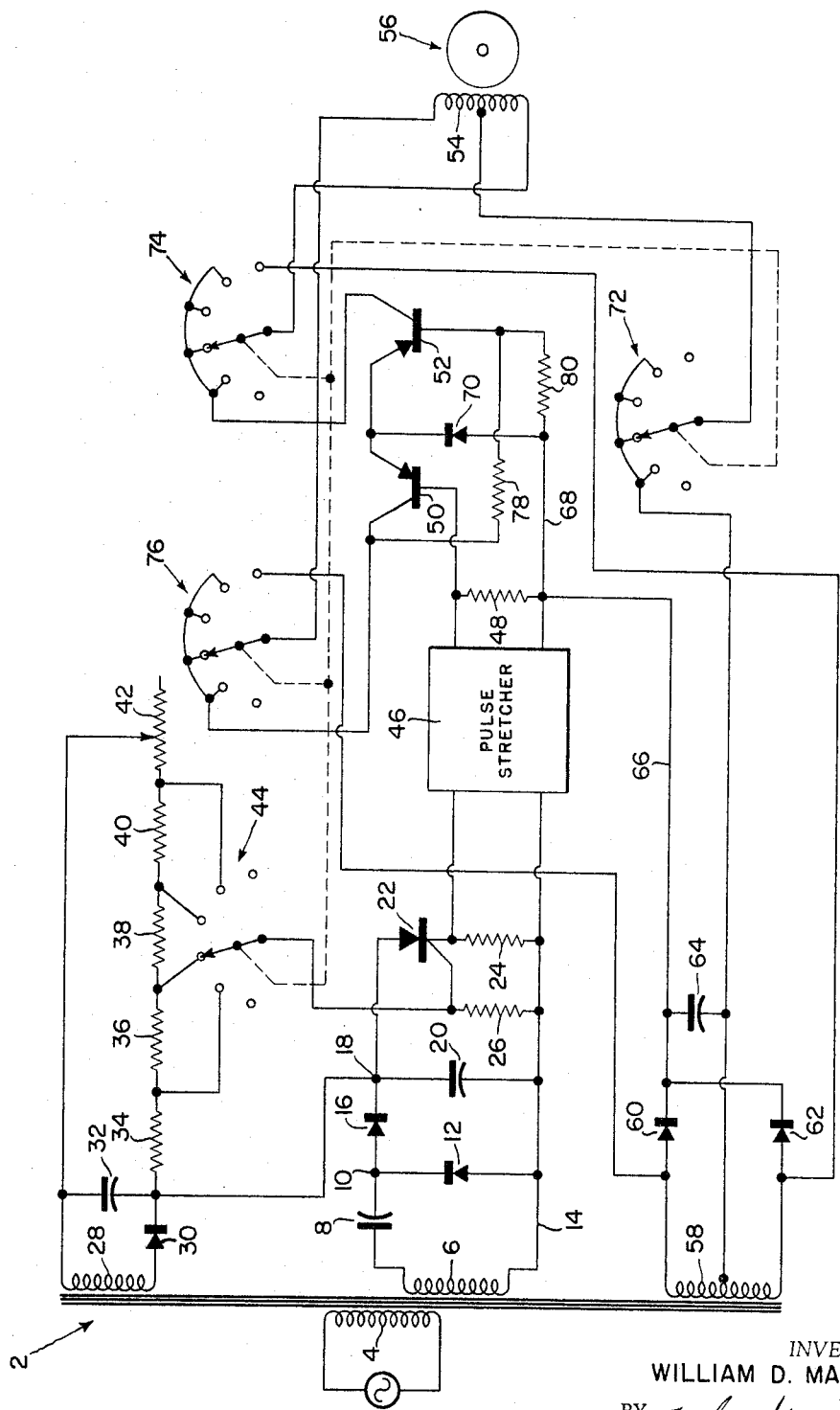
INVENTOR.
WILLIAM D. MACGEORGE
BY Arthur H. Swanson
ATTORNEY.

3,283,233
ELECTRONIC CONTROL SYSTEM
William D. Macgeorge, Huntingdon Valley, Pa., assignor to Honeywell Inc., a corporation of Delaware
Filed July 15, 1963, Ser. No. 295,163
3 Claims. (Cl. 318—138)

This invention relates to electrical apparatus, and more particularly to an electronic control system for controlling the speed of an electric motor.

There are numerous instances when it is desirable to be able to drive a piece of apparatus at any one of a plurality of predetermined speeds. One such instance is in the case of the drive means for the strip chart of a recorder such as used in recording prevalent conditions in connection with industrial processes. Heretofore, selectivity in chart drive speed has been obtained through the use of fixed speed motors and interchangeable gear trains. On the other hand, some rather complex systems have been devised using elaborate variable frequency oscillators and motors driven thereby.

It is an object of the present invention to provide an improved system for selectively driving a motor at any one of a plurality of predetermined speeds.

It is a further object of this invention to provide an improved motor driving system, as set forth, wherein said system is all electrical, which accomplishes the speed selection without necessitating any change of gear ratios, and features simplicity in organization and operation.

In accomplishing these and other objects, there has been provided, in accordance with the present invention, an electrical circuit for the selective energization of a drive motor to cause said motor to be operated at any one of a plurality of predetermined speeds. Line frequency signals, drawn from the power lines, constitutes a basic reference signal. A capacitive storage circuit is charged by pulses from the line. A triggered gate means is provided which constitutes a discharge path for the storage circuit whenever the stored signal exceeds an adjustable predetermined value, each adjustment being representative of a selected speed. Means are provided which are responsive to the discharge of said storage circuit through said gate means to produce, effectively, a series of pulses having a positive and negative peak, the pulses corresponding in frequency to the frequency of the discharge through said gate. These pulses will, accordingly, be of a frequency which is an integral submultiple of the line frequency and will be as stable as the line frequency. The pulses thus produced are applied to a simple, multipoled motor which is characterized in that it will advance by one pole for each pulse having a positive and negative peak.

A better understanding of this invention may be had from the following detailed description when read in connection with the accompanying drawing, in which:

The single figure is a schematic diagram of a circuit embodying the present invention.

Referring now to the drawing in more detail, there is shown a power transformer 2 having a primary winding 4 connected to the power lines. A first secondary winding 6 is connected, first, to a storage circuit and, then, to a gate means. The storage circuit includes a first capacitor 8 serially connected between one terminal of the secondary winding 6 and a first junction point 10. An asymmetrically conducting diode 12 is connected between a lead 14, from the other terminal of the secondary winding 6, and the junction point 10. A second asymmetrically conducting diode 16 is connected serially between the first junction 10 and a second junction 18. Between the second junction 18 and the lead 14, there is connected a second capacitor 20.

The triggered gate means includes a silicon controlled rectifier 22 having its anode connected to the second junction 18 and its cathode connected, through a resistor 24, to the lead 14. The control electrode of the silicon controlled rectifier is connected, through a resistor 26, to the lead 14. A source of bias signal is also connected to the control electrode of the silicon controlled rectifier 22.

The source of bias signal includes a second secondary winding 28 on the transformer 2. A diode rectifier 30 and a filter capacitor 32 constitute, a half-wave rectifier for the signal developed across the winding 28 to provide a D.C. signal across the capacitor 32. A plurality of serially connected resistors 34, 36, 38, 40 and 42 are connected across the capacitor 32. The junction between the diode 30, the capacitor 32, and the first resistor 34 is connected to the junction 18, therefrom to the anode of the silicon controlled rectifier 22. A selector switch 44 is provided which includes a plurality of fixed contacts and a movable contact. The movable contact of the switch 44 is connected to the control electrode of the silicon controlled rectifier 22. While five resistors are shown in the bias supply circuit, it will be apparent that a greater or smaller number of such resistors may be used to provide more or fewer possible speed selections. The five illustrated resistors provide a choice of four speeds. The selector switch includes one fixed contact position for each of the four speed choices, plus one fixed contact position representing an "off" position, plus one additional contact position representing live frequency direct drive, as will be more fully set forth hereinafter. Thus, the left hand contact position of the switch 44 is an open contact and represents the off position; the second contact is connected to the junction between the resistors 34 and 36; the third contact is connected to the junction between the resistors 36 and 38; the fourth contact is connected to the junction between the resistors 38 and 40; the fifth contact is connected to the junction between the resistors 40 and 42; and the sixth contact is an open contact. When the movable contact of the switch 44 engages one of the four fixed contacts connected to the bias circuit, a predetermined bias signal is applied to the control electrode of the silicon controlled rectifier 22, thereby to control the triggering condition thereof.

Whenever the silicon controlled rectifier is triggered to a conductive state, the capacitor 20 is discharged therethrough. The discharge of the capacitor 20 through the rectifier 22 produces a voltage signal across the resistor 24. That signal is the sharp pulse signal which is too narrow to be used as an ultimate control signal. Accordingly, the output of the gate means is connected to a suitable pulse stretching circuit 46. The pulse stretching circuit may be, for example, any of a number of well known monostable multivibrator circuits. Such circuits are characterized in that an applied input pulse triggers the multivibrator into one condition of conduction; then, after a predetermined delay, the multivibrator returns to its original or stable state of conduction. The output signal from such a device is a pulse having a width determined by the time interval required for the multivibrator to return to its original condition after having been triggered. In an apparatus constructed in accordance with the present invention, a pulse width of sixteen milliseconds was found to be adequate. Such multivibrators are well known in the art and require no further explanation here. The extended pulse output from the multivibrator 46 is developed across a resistor 48, and applied to a control circuit.

The control circuit includes a first and a second transistor 50 and 52 which are interposed between a power source and the field winding 54 of a motor 56. The motor is of the type having a multiplicity of poles and which is characterized in that when a pulse having a positive and then a negative peak is applied to the winding, the rotor of the motor will be angularly advanced by an amount substantially equal to the angular spacing between adjacent poles. The power supply for the control circuit includes a third secondary winding 58 on the power transformer 2. A full-wave rectifier, including a pair of diodes 60 and 62, and a filter capacitor 64, is connected to the secondary winding 58, to produce a D.C. power source. The positive lead 66 from the power source is connected to the lower or reference lead 68 from the pulse stretcher 46. The reference lead 68 is connected, through a bias diode 70, to the conjoined emitters of the two transistors 50 and 52 of the control circuit. The negative lead of the power source is connected, through a switch 72, to the center tap on the motor winding 54. One end terminal of the motor winding 54 is connected, through a switch 74, to the collector electrode of the transistor 52. The other end terminal of the motor winding 54 is connected, through a switch 76, to the collector electrode of the transistor 50. The collector electrode of the transistor 50 is also connected, through a resistor 78, to the base electrode of the transistor 52. The base electrode of the transistor 52 is also connected, through a resistor 80, to the reference lead 68. The upper or signal lead from the pulse stretcher is connected to the base electrode of the transistor 50.

The three switches 72, 74, and 76 are identical to and ganged for operation with the selector switch 44. As in the selector switch 44, the first contact position on each of the three switches 72, 74, and 76, is an open contact, representative of the off position. The second, third, fourth and fifth contacts on each of the three switches 72, 74, and 76, are connected together, respectively. In these positions, corresponding to the four bias selecting positions of the switch 44, the motor winding 54 is connected to the power supply source through the transistors 50 and 52 of the control circuit. The sixth contact position of the switch 44 is an open contact, no bias being applied to the gate circuit at that position. The sixth contact of the two switches 74 and 76, respectively, is connected directly to the A.C. terminals of the power source transformer 58, ahead of the rectifiers. In the switch positions two through five, the speed of the motor 56 is controlled by the pulsations developed through the triggered gate and the control circuit. In the sixth switch position, the motor is energized directly from the line frequency. Since each of the speeds effected through the control circuit results from pulsations at some integral submultiple of the line frequency, the direct energization of the motor at the line frequency, as in the sixth position of the switches, provides one additional speed which may be selected.

In operation, the alternating signals developed across secondary winding 6 produce charging of the capacitor 8 through the diode 12 on one half cycle of the energizing alternating signals. On the next or opposite half cycle, the energizing signal plus a portion of the charge stored on the capacitor 8 is applied as a charging signal to the larger capacitor 20 through the diode 16. The charge on the capacitor 20 continues to build up until it is discharged through the silicon controlled rectifier 22. Since the charge build up on the capacitor 20 is in increments at the line frequency rate, it is apparent that the discharge rate or pulse rate output from the gate means will be an integral submultiple of the line frequency. The discharge of the capacitor 20 through the silicon controlled rectifier 22 is controlled by the bias signal applied to the control electrode of the rectifier 22.

The bias circuit, including the series string resistors 34 to 42 and the selector switch 44, provides means for selecting a number of different bias values to be applied to the control electrode of the silicon controlled rectifier. In one circuit constructed in accordance with the present invention, the bias values were chosen that, based on a line frequency of 60 cycles per second, the pulse repetition rate from the gate means were 30, 12, 6 and 3 per second with the selector switch in positions two through five, respectively.

The output pulse from the gate means is a sharp narrow spike. The pulse stretcher 46, as previously mentioned, converts that spike to a more usable pulse. With the switches 44 and 72 through 76 in any of the positions two through five, the negative side of the motor control power source is connected to the collector electrodes of both transistors 50 and 52. The resistors 78 and 80 provide a bias circuit for the base electrode of the transistor 52, normally biasing the transistor 52 into conduction through the lower half (as illustrated) of the motor winding 54. A negative pulse from the pulse stretcher 46 is applied to the base electrode of the transistor 50, causing that transistor 50 to be conductive during the continuance of the applied pulse. The conduction of the transistor 50 allows current to flow in the upper half (as illustrated) of the motor winding 54 and causes the transistor 52 to be bias to cut-off. Upon the termination of the applied pulse from the pulse stretcher 46, the transistor 50 again becomes nonconductive and the transistor 52 again becomes conductive. Since the signals from the D.C. power source are alternately applied to the two halves of the motor winding, the resultant is as if a positive and a negative pulse were applied to the motor winding. This, as hereinbefore mentioned causes the rotor to be angularly advanced by an amount equal to the angular spacing between adjacent poles of the motor. For example, in a motor having 24 poles, the rotor would be advanced 15° for each pulse transmitted by the pulse stretcher 46. Thus the speed of the motor is controlled by the repetition rate of the produced pulses which, in turn, is controlled electrically by selecting from a choice of predetermined values for a bias signal to be applied to the pulse producing circuit. One additional feature which should be noted is that the system is relatively free from inaccuracies as a result of variations in the line voltage. The charging voltage for the storage circuit and the bias voltage for the gate circuit are both derived from the same line source, therefore, a change in one, as a result of line voltage changes, will be offset by a corresponding change in the other.

Thus there has been provided a variable speed motor control circuit wherein speed selection and control is accomplished electrically, which is simple in construction and operation, and which is as stable as the line frequency from which the control is derived.

What is claimed is:

1. A motor control system comprising a pulse generator including a capacitive storage circuit means and a bias controlled gate circuit means connected to said storage circuit means for periodically discharging said storage circuit means at a repetition rate determined by the magnitude of a bias signal applied to said gate circuit means, a bias selection circuit including a resistance string for producing a plurality of bias voltage signals and a selector switch means connected between said resistance string and said gate circuit means for applying a selected one of said plurality of bias signals to said gate circuit means, a stepping motor having a field winding, said motor being responsive to a pulse having a positive and a negative peak for advancing a single increment, and control circuit means connected between said gate circuit means and said motor winding, said control circuit means being responsive to pulses from said gate circuit means to effectively apply a series of pulses having positive and negative peaks to said motor winding.

2. The invention as set forth in claim 1 wherein said gate circuit means includes a silicon controlled rectifier.

3. The invention as set forth in claim 1 wherein said control circuit means includes a pair of transistors connected in a monostable flip-flop configuration.

No references cited.

ORIS L. RADER, *Primary Examiner.*

G. A. FRIEDBERG, *Assistant Examiner.*